(12) United States Patent
Ritchey (10) Patent No.: US 9,845,126 B2
(45) Date of Patent: Dec. 19, 2017

(54) SEAT ATTACHMENT DEVICE (75) Inventor: Thomas Ritchey, Woodside, CA (US)

(73) Assignee: RITCHEY DESIGN, INC., Redwood City, CA (US)

( * ) Notice: Subject to any disclaimer, the term of this patent is extended or adjusted under 35 U.S.C. 154(b) by 0 days.

(21) Appl. No.: 12/728,759

(22) Filed: Mar. 22, 2010

(65) Prior Publication Data

US 2010/0171347 A1 Jul. 8, 2010

Related U.S. Application Data

(63) Continuation of application No. 11/312,008, filed on Dec. 19, 2005, now Pat. No. 7,681,947.

(51) Int. Cl.
*B62J 1/08* (2006.01)

(52) U.S. Cl.
CPC ....................................... *B62J 1/08* (2013.01)

(58) Field of Classification Search
USPC ........................................ 297/195.1, 215.14
See application file for complete search history.

(56) References Cited

U.S. PATENT DOCUMENTS

| | | | |
|---|---|---|---|
| 3,933,391 A | 1/1976 | Shook | |
| 4,440,440 A | 4/1984 | Juy | |
| 4,789,172 A | 12/1988 | Mueller | |
| 5,020,851 A | 6/1991 | Chen | |
| 5,222,781 A | 6/1993 | Mele | |
| 5,228,796 A | 7/1993 | Kao | |
| 5,244,301 A | 9/1993 | Kurke et al. | |
| 5,295,727 A | 3/1994 | Kao | |
| 5,333,826 A | 8/1994 | Lai | |
| 5,547,155 A | 8/1996 | Herting | |
| 5,568,958 A | 10/1996 | Chen | |
| 5,664,829 A | 9/1997 | Thomson et al. | |
| 5,695,241 A | 12/1997 | Olsen et al. | |
| 5,722,718 A | 3/1998 | Still et al. | |
| 5,749,622 A | 5/1998 | Tseng | |
| 5,979,978 A | 11/1999 | Olsen et al. | |
| 5,988,741 A | 11/1999 | Voss et al. | |
| 6,164,864 A | 12/2000 | Beach et al. | |
| 6,174,027 B1 | 1/2001 | Lemmens | |
| 6,561,579 B1 | 5/2003 | Weir | |
| 6,848,701 B2 | 2/2005 | Sinyard et al. | |
| 7,125,072 B2 | 10/2006 | Bugle et al. | |
| 7,131,350 B2 | 11/2006 | McColligan | |
| 7,318,623 B2 * | 1/2008 | Shook | ........................ 297/195.1 |
| 2002/0149241 A1 | 10/2002 | Morgan, Jr. | |
| 2002/0166941 A1 | 11/2002 | Dunlap | |
| 2003/0080594 A1 | 5/2003 | Geyer et al. | |

(Continued)

FOREIGN PATENT DOCUMENTS

| | | |
|---|---|---|
| FR | 2 793 760 | 11/2000 |
| GB | 930 266 | 7/1963 |
| WO | WO 02/081291 | 10/2002 |

OTHER PUBLICATIONS

WO97/07012 International PCT application dated Feb. 27, 1997.

(Continued)

*Primary Examiner* — Sarah McPartlin
(74) *Attorney, Agent, or Firm* — DLA Piper LLP (US)

(57) ABSTRACT

A seat attachment device is provided that uses a single bolt to secure the seat rails to the seat attachment device and the seat attachment device to a post.

8 Claims, 13 Drawing Sheets

(56) References Cited

U.S. PATENT DOCUMENTS

| | | |
|---|---|---|
| 2003/0227198 A1 | 12/2003 | Menayan |
| 2004/0174052 A1 | 9/2004 | Barnett |
| 2005/0067863 A1 | 3/2005 | Roizen |
| 2005/0200170 A1 | 9/2005 | Liao |
| 2006/0006707 A1 | 1/2006 | Lin |
| 2006/0152045 A1 | 7/2006 | Okajima et al. |
| 2007/0040423 A1 | 2/2007 | Chiang |
| 2007/0063554 A1 | 3/2007 | Liao |
| 2007/0138846 A1 | 6/2007 | Ritchey |
| 2007/0145794 A1 | 6/2007 | Dal Pra' et al. |

OTHER PUBLICATIONS

WO97/07012 International PCT application Corrected Version dated Jul. 3, 1997.
WO97/07012 International Search Report dated Apr. 10, 1997.

* cited by examiner

SEAT ATTACHMENT DEVICE

PRIORITY CLAIM/RELATED APPLICATIONS

This application is a continuation of and claims priority under 35 USC 120 to U.S. patent application Ser. No. 11/312,008, filed on Dec. 19, 2005 and entitled "Seat Attachment Device", the entirety of which is incorporated herein by reference.

FIELD OF THE INVENTION

The invention relates generally to a seat attachment device for a transportation device, such as a bicycle.

BACKGROUND OF THE INVENTION

Figure 1:
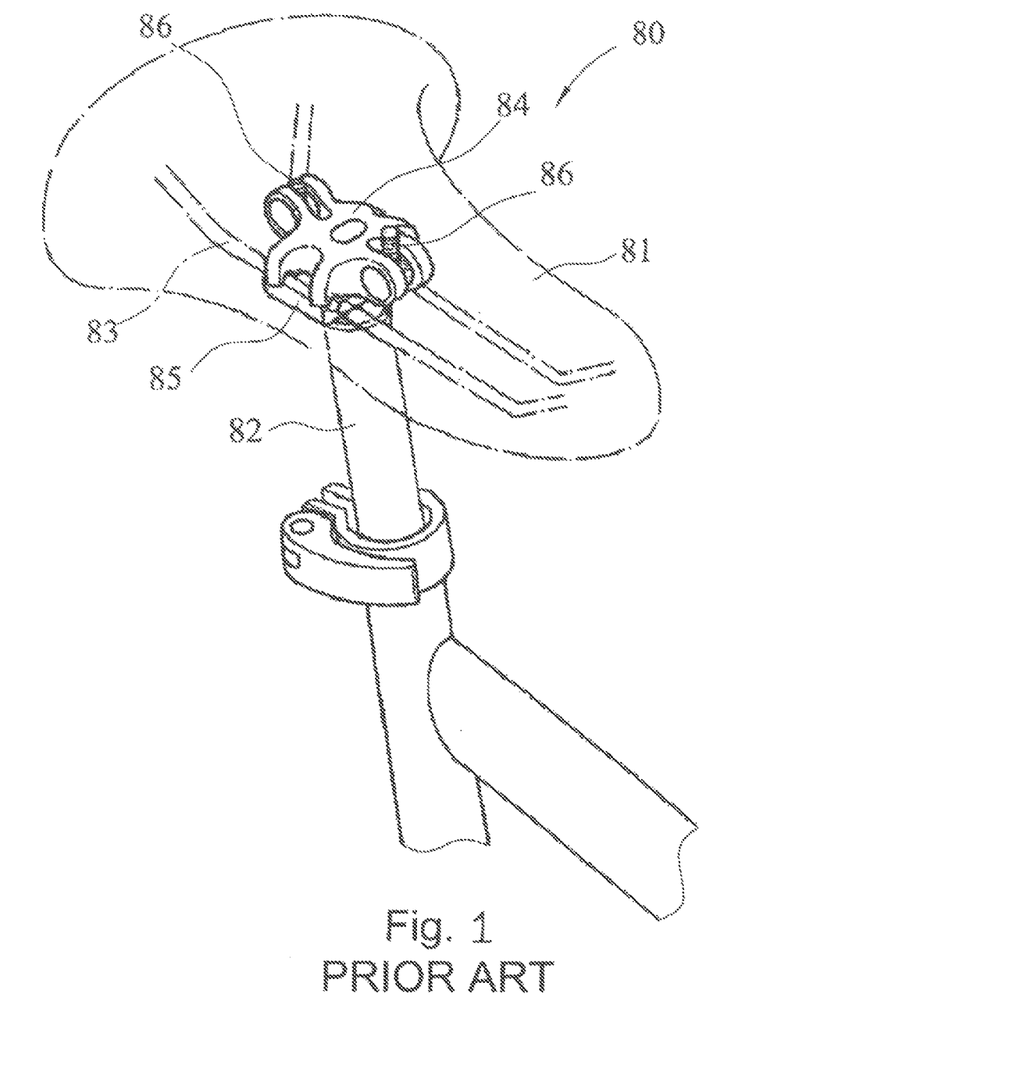
FIG. 1 illustrates a prior art seat attachment device.
Figure 2:
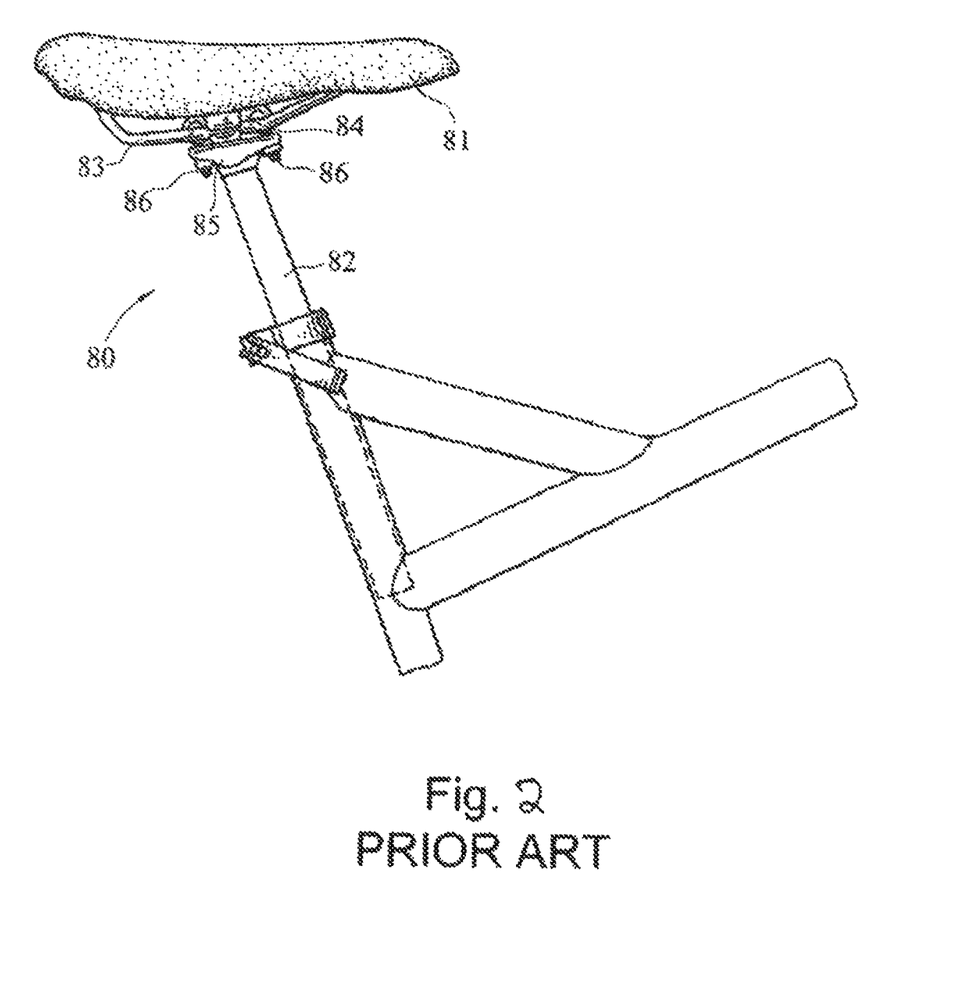
FIG. 2 illustrates another view of the prior art seat attachment device.

Most modern bicycles have a seat attachment device that inserts into the frame of the bicycle and may be tightened in order to secure a saddle for the bicycle to the frame of the bicycle. A conventional bicycle seat assembly 80 is shown in FIGS. 1 and 2 and generally includes a seat 81, a post 82 and a securing device for connecting the seat 81 to the post 82. The securing device includes a top bracket 84 connected to the underside of the seat 81 and a lower bracket 85 which is fixed on a top of the post 82. Two rails 83 are clamped between the top bracket 84 and the lower bracket 85. Two bolts 86 extend through two transverse bars connecting the top bracket 84 and the lower bracket 85 to pull the top bracket 84 and the lower bracket 85 toward each other so that the two rails 83 are securely clamped. It is noted that the two bolts 86 are threaded through the two bars from in top bracket 84 so that it is difficult to adjust the angle of the seat relative to the post 82. In addition, the shocks from the roads are transferred along the post 82 to the seat 81 and the direction that the shocks are transferred is the same as the bolts 86 which are easily loosened by the shocks. Thus, it is desirable to provide a seat attachment device that overcomes these limitations of the current seat attachment device and it is to this end that the present invention is directed.

SUMMARY OF THE INVENTION

A seat attachment device is provided in which the seat attachment device is lightweight and uses a minimal amount of structure to secure a saddle to a bicycle. The seat attachment device permits easy adjustment of the seat attachment device (and the seat secured by the seat attachment device) relative to the post. The seat attachment device has first and second outer clamps wherein each outer clamp has a channel region in which a seat rail may be positioned when the seat attachment device is assembled. The outer clamps also have a bore through which a securing mechanism, such as a bolt, is passed in order to secure the pieces of the seat attachment device together and a chamfered surface which is pressed against the post to affix the pieces of the seat attachment device together. For each outer clamp, the channel region is above the bore through which the securing mechanism is passed and the bore is above the chamfered surface.

Thus, in accordance with the invention, a seat attachment device is provided wherein the seat attachment device has a post and an inner clamp mechanism that is positionable on the post and has a channel region. The seat attachment device also has a first outer clamp that has a channel region and a chamfered surface that is beneath the channel region and a second outer clamp that has a channel region and a chamfered surface that is beneath the channel region. The seat attachment device also has a securing mechanism that presses the chamfered surface of the first outer clamp against a first side of the post and the chamfered surface of the second outer clamp against an opposite side of the post wherein the channel regions of the inner clamp mechanism and the first and second outer clamps form a channel into which a seat rail may be positioned to secure the seat rail to the seat attachment device.

In accordance with another aspect of the invention, an outer clamp for a seat attachment device is provided. The outer clamp has a channel region into which a seat rail may be positioned and a bore, located underneath the channel region, through which a securing mechanism may be passed. The outer clamp also may have a chamfered surface, located below the bore, that may be pressed against a post in order to secure the outer clamp to a post of a seat attachment device.

DETAILED DESCRIPTION OF A PREFERRED EMBODIMENT

The invention is particularly applicable to a seat attachment device implemented as set forth in the following diagrams and figures and it is in this context that the invention will be described. It will be appreciated, however, that the seat attachment device in accordance with the invention has greater utility since it may be implemented in different manners and may also be used to secure a seat or saddle in contexts other than a bicycle saddle. For example, the seat attachment device may be constructed out of different materials that those described below and be within the scope of the invention or the seat attachment device may be used for an application other than securing a saddle to a bicycle and those other applications are within the scope of the invention.

Figure 3:
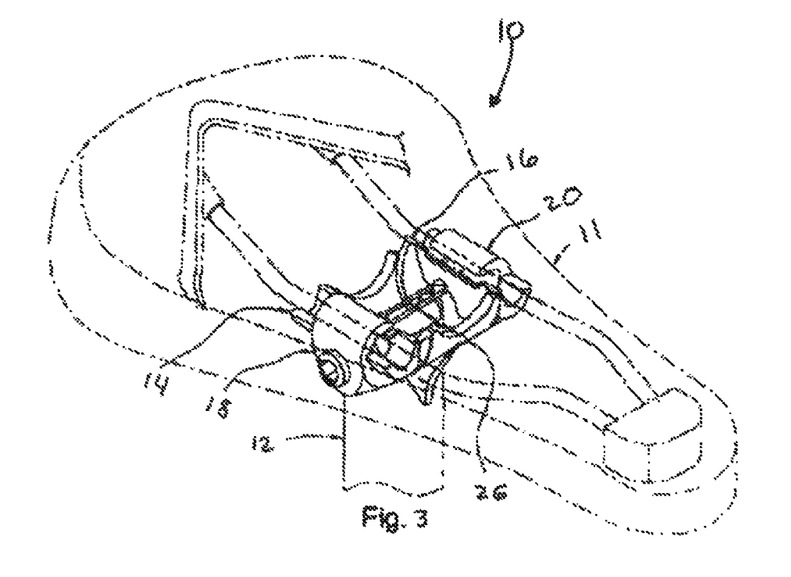
FIG. 3 illustrates an example of an embodiment of a seat attachment device.
Figure 4:
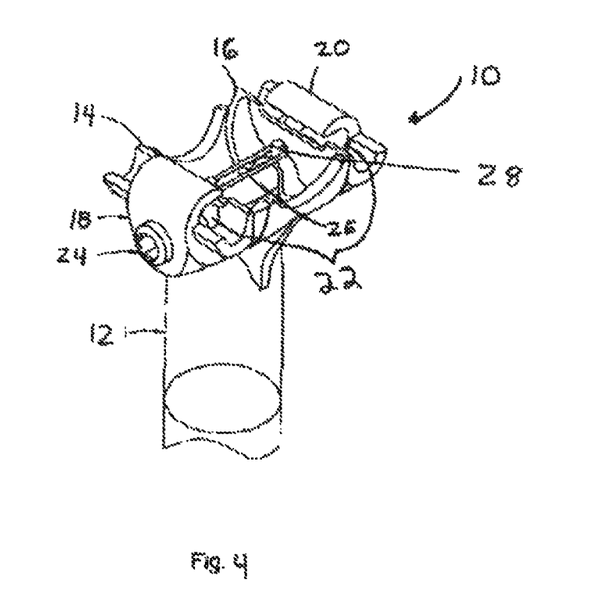
FIG. 4 illustrates more details of the seat attachment device shown in FIG. 3.

FIGS. 3 and 4 are diagrams illustrating an example of an embodiment of a seat attachment device 10 that secures a saddle 11 (shown in phantom in FIG. 3) to a post 12. The seat attachment device comprises first and second inner clamps 14,16 (that may be collectively known as an inner clamp mechanism) and first and second outer clamp 18, 20 wherein the first inner and outer clamps 14, 18 and the second inner and outer clamps 16, 20 each form a channel 22 into which the rails of a seat may be positioned and secured when a securing mechanism 24, such as a bolt in one embodiment, is passed through the first outer clamp 18 and second outer clamp 20 and tightened. In the example of the seat attachment device shown in FIGS. 3 and 4, the first inner clamp 14 and second inner clamp 16 are maintained at a predetermined distance from each other using a mechanism 26 that is attached over a post member 28 that is part of each inner clamp. However, the seat attachment device 10 in accordance with the invention may be implemented without the mechanism 26 and without the post members 28 that are shown in FIGS. 3 and 4. For example, a one piece inner clamp mechanism may be used. In the seat attachment device shown in FIGS. 3 and 4, the securing mechanism is located below the channels 22 into which the seat rails are placed and above a tapered/chamfered surface of the outer clamps 18, 20 (shown in FIG. 5D) that will be described in more detail below. The location of the securing mechanism relative to the channel 22 and the surfaces of the outer clamps results in the seat attachment device (with only the single securing mechanism 24) being able to exert sufficient force to hold the seat rails in the channels and also releasably secure the seat attachment mechanism 10 to the post 12. The seat attachment device 10 in accordance with the invention minimizes the material and structure required to hold the seat rails of a saddle which reduces the overall weight of the seat attachment device without sacrificing strength.

Figure 5A:
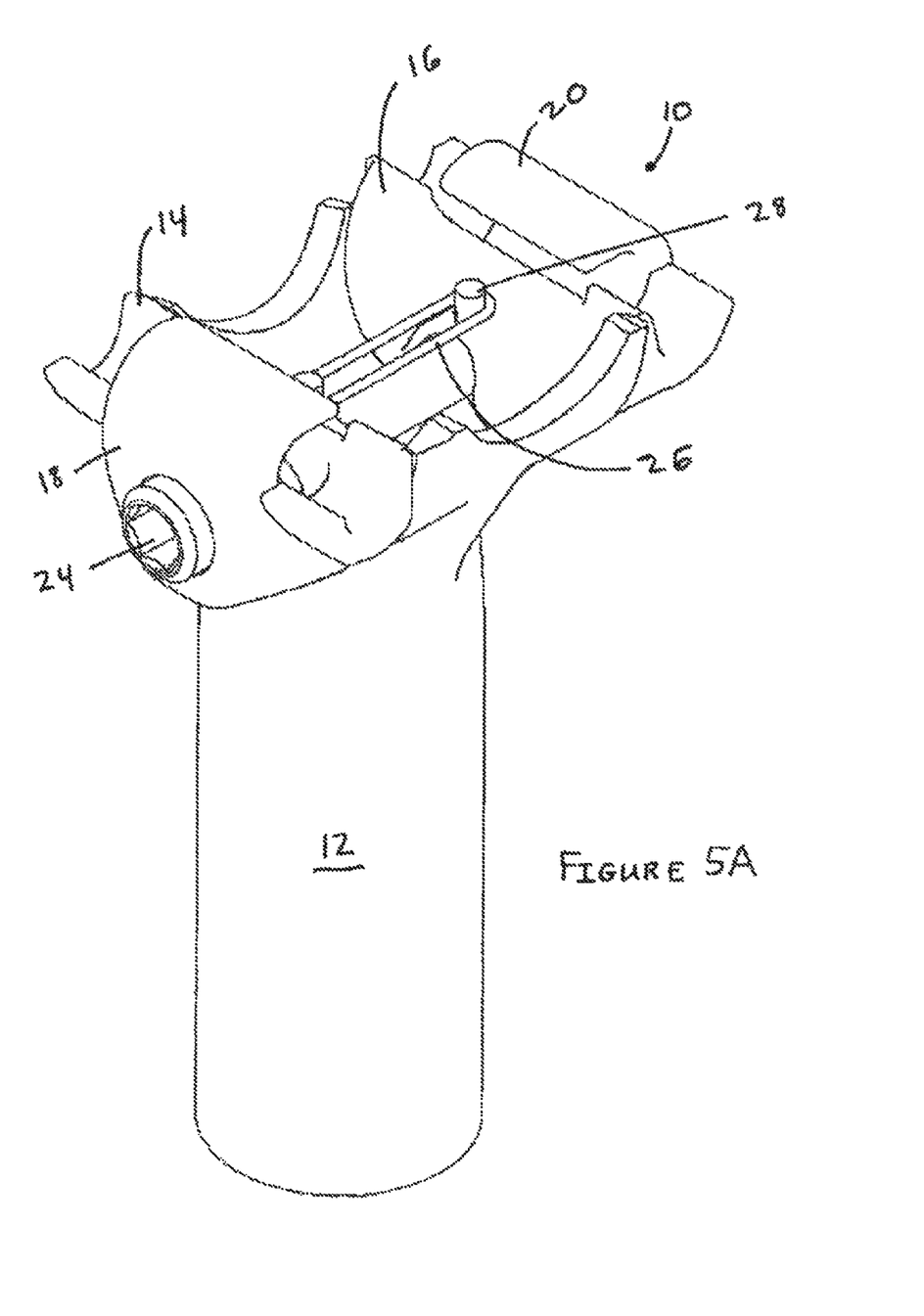
FIGS. 5A-D are diagrams illustrating more details of the seat attachment device shown in FIGS. 3 and 4.
Figure 5B:
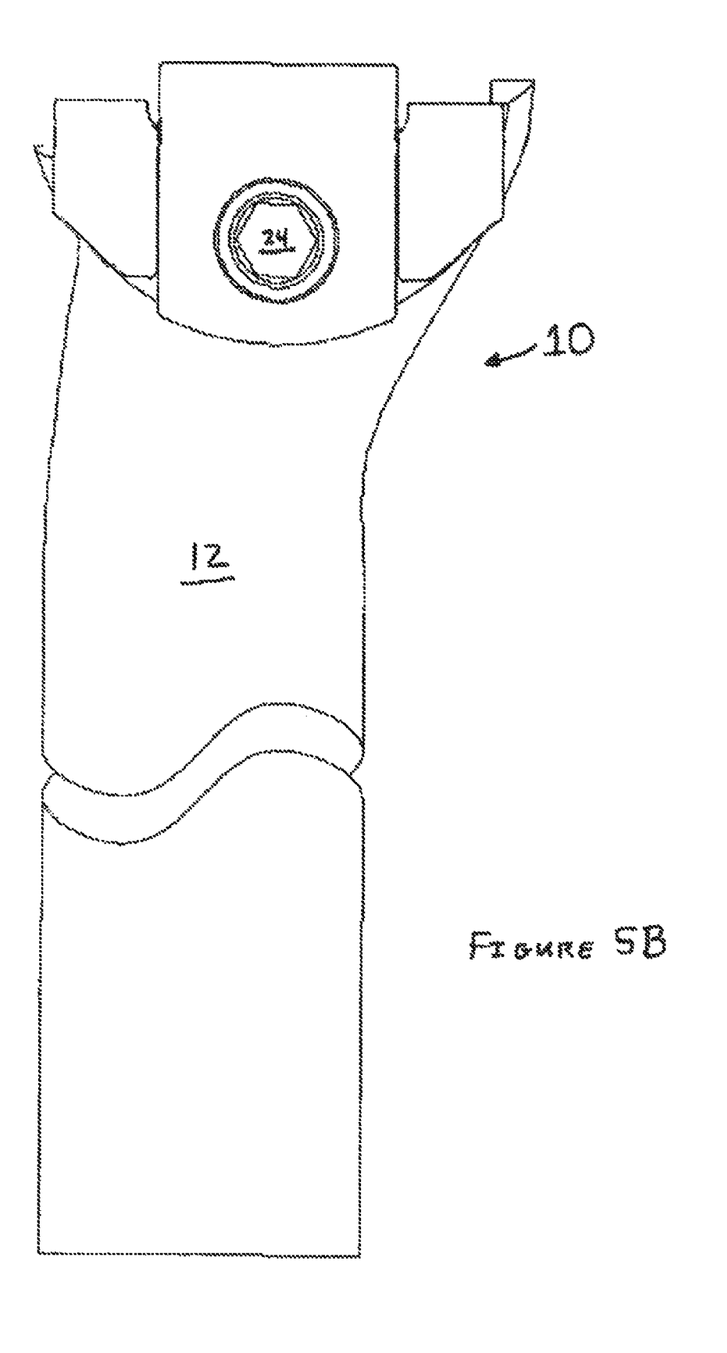
Figure 5C:
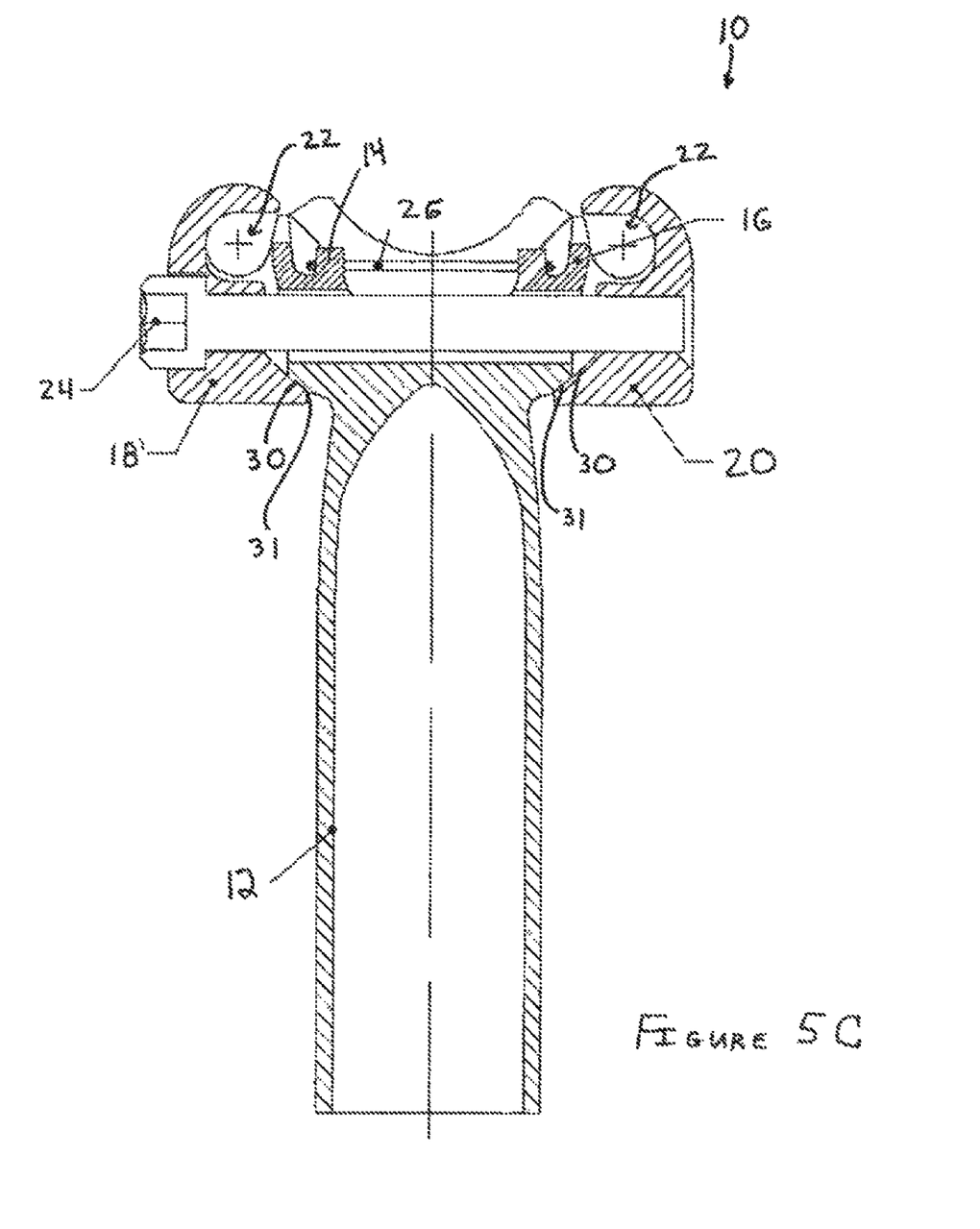
Figure 5D:
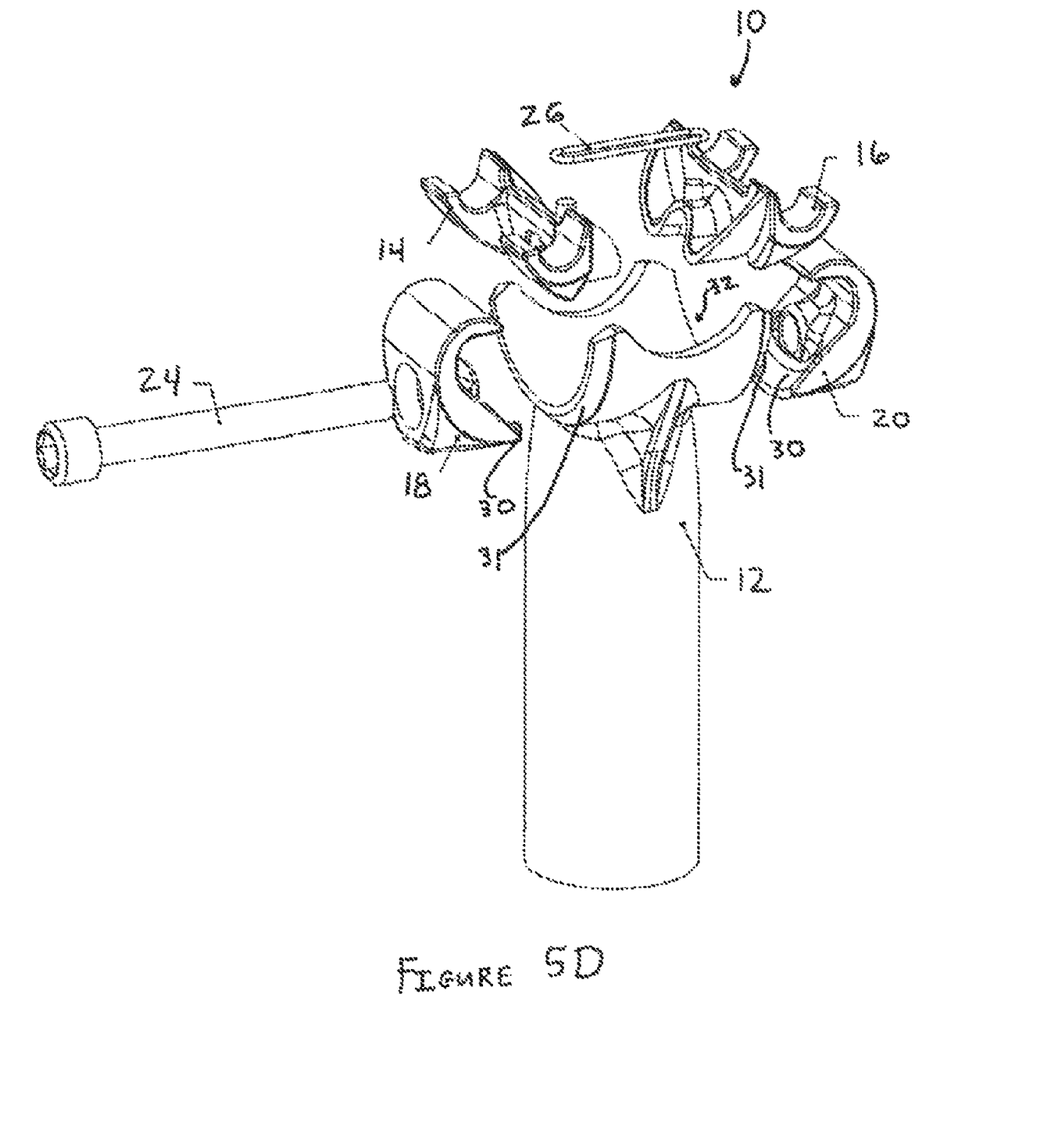

FIGS. 5A-D are diagrams illustrating more details of the seat attachment device shown in FIGS. 3 and 4. FIG. 5A shows the seat attachment device 10 when it is assembled and FIG. 5B illustrates a side view of the seat attachment device 10. FIG. 5C is a cross sectional view of the seat attachment device 10 and FIG. 5D is an assembly diagram of the seat attachment device 10. As shown in FIG. 5D, the seat attachment device is assembled by placing the inner clamps 14, 16 onto a head portion 32 of the post 12, placing the outer clamps 18,20 into their respective positions and then inserting the securing mechanism 24 through the outer clamps and tightening the securing mechanism. To secure a seat with seat rails to the post 12, the securing mechanism 24 is loosened sufficiently to permit the seat rails to be placed into the channels 22 of the seat attachment device and then the securing mechanism is tightened.

As shown in FIGS. 5C and 5D, for this embodiment, each outer clamp 18, 20 has an interface surface 30, that may be a chamfered surface in this embodiment, that, when the seat attachment device is assembled, presses against an interface surface 31, such as a tapered surface in this embodiment, of the post 12 to releasably secure the seat attachment device 10 to the post 12. Thus, the seat attachment device 10 is secured together and to the post (and secures the saddle to the seat attachment device) using a single securing mechanism 24 and interface surfaces 30, 31 of the outer clamps 18, 20 and the post 12. The chamfered surface 30 is pressed against the tapered portion 31 of the post 12 when the seat attachment device 10 is assembled together. The outer clamps 18, 20 thus releasably secure both the seat attachment device 10 to the post 12 and the saddle 11 to the seat attachment device 10 and the post 12. In the exemplary embodiment shown in these figures, the post 12 has a head portion 32 that is shaped with curved portions so that the inner clamps 14, 16 can rest on the head portion 32 of the post 12 and the chamfered surface 30 of each outer clamp 18, 20 can be pressed against the tapered portion 31 of the post 12.

FIG. 5D also illustrates that the seat attachment device 10 can be moved relative to the head portion 32 when the securing mechanism 24 is not tightened so that the angle of the seat attachment device 10 (and therefore the seat rails and the seat that is secured by the seat attachment device) relative to the post 12 can be angularly adjusted. To adjust the seat angle relative to the post 12, the securing mechanism 24 is loosened somewhat so that the outer clamps 18, 20 can slide along the tapered surface 31 of the head 32 which changes the angle of the seat attachment mechanism 10 relative to the post 12. When the desired adjustment is made, the securing mechanism 24 is again tightened so that the chamfered surfaces 30 of the outer clamps 18, 20 are pressed against the tapered portion 31 of the head 32 of the post 12 to again secure the seat attachment mechanism 10 and the seat to the post 12.

Figure 6:
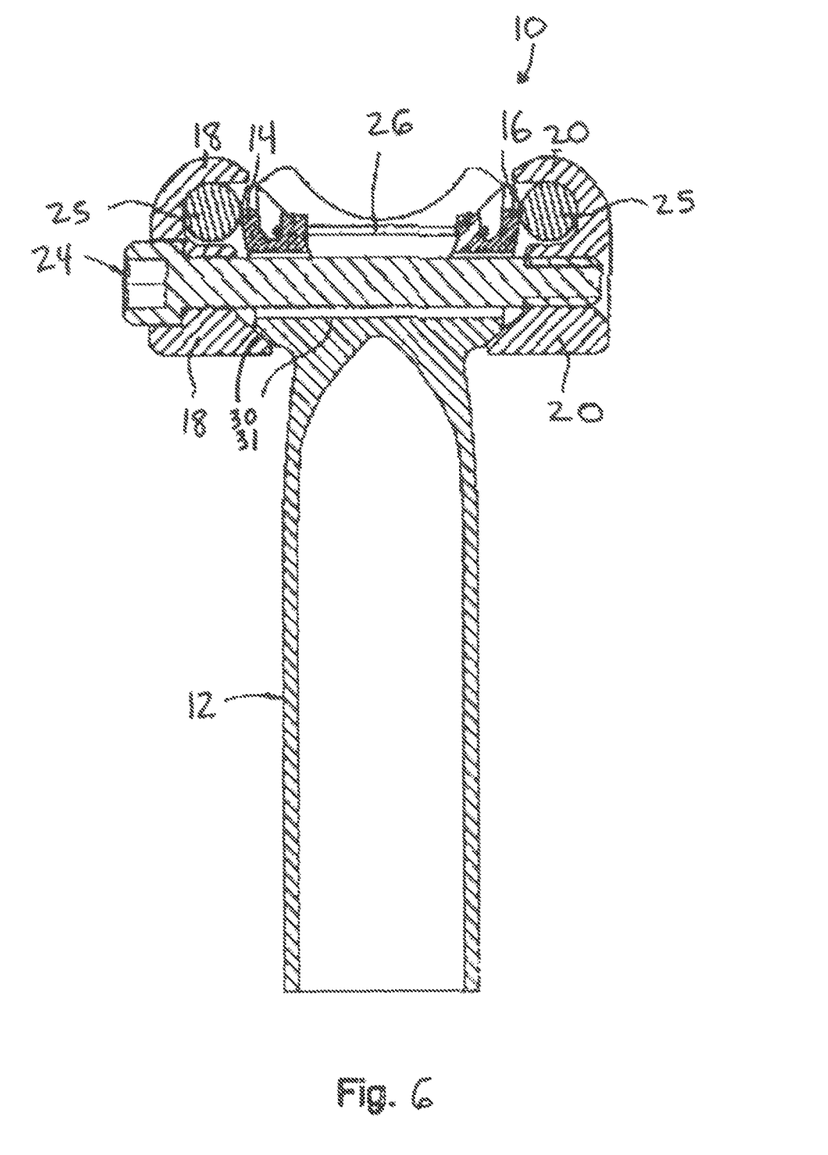
FIG. 6 is a cut-away view of the seat attachment device shown in FIGS. 3 and 4.

As can be seen in FIG. 5D, the securing mechanism 24 does not pass through the inner clamps 14, 16 and in fact the inner clamps rest on top of the head portion 32 of the post 12. In a preferred embodiment shown in FIGS. 5A-5D, the securing mechanism may be a steel bolt while the post 12, inner clamps 14,16 and outer clamps 18,20 may be made of aluminum and the mechanism 26 may be an O-ring that is made out of a plastic material. The invention, however, is not limited to the materials set forth above since the post 12 may also be made of titanium, carbon fiber/aluminum or carbon fiber and the other components of the seat attachment device may be made out of other materials. In addition, although the inner clamps 14, 16 are separate pieces, they can be combined into a single piece. Additionally, the clamps 14-20 may be made of carbon fiber material with an aluminum insert at locations where the compression strength of aluminum is needed, such as in the channel regions of the clamps and on the chamfered surface. In accordance with the invention, the seat attachment device may also be modified to make it less expensive to manufacture such as using a one piece inner clamp structure or knurling certain surfaces of the seat attachment device 10. FIG. 6 is a cut-away view of the seat attachment device 10 shown in FIGS. 3 and 4 wherein a pair of seat rails 25 are secured to the seat attachment device 10 and the seat attachment device 10 is secured to the post 12 by the chamfered surface 30 and the tapered portion 31 being pressed together as the securing mechanism 24 is tightened.

Figure 7:
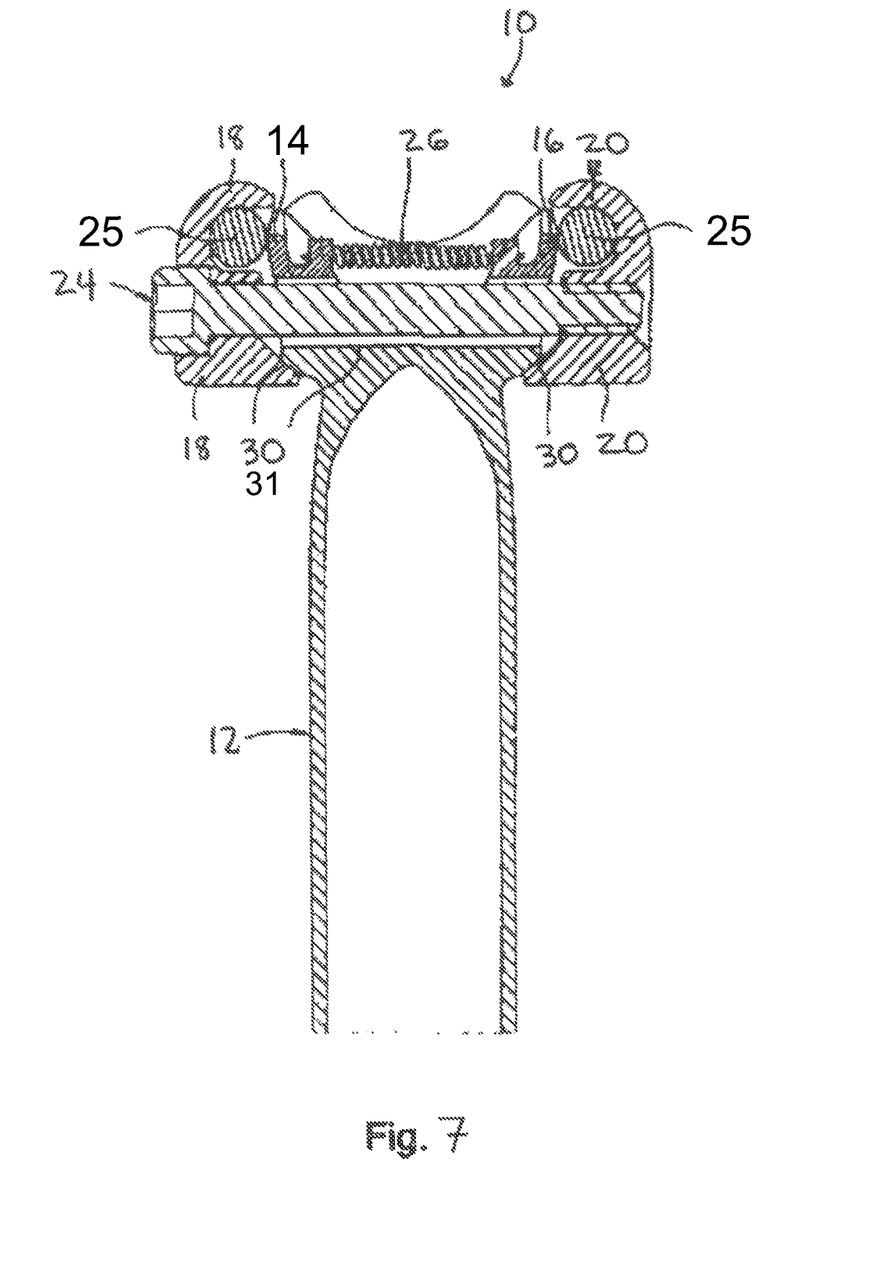
FIG. 7 illustrates an example of another embodiment of the seat attachment device.
Figure 8:
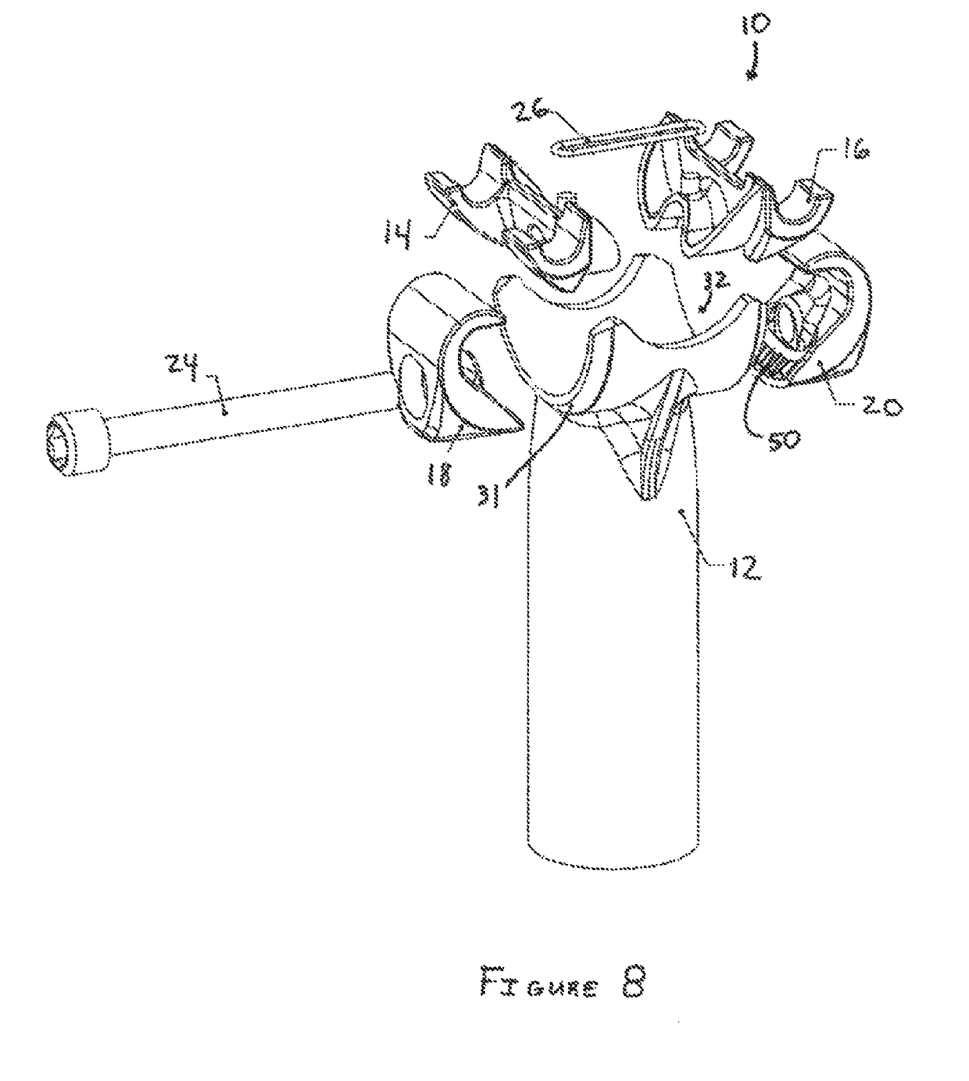
FIG. 8 illustrates an example of another embodiment of the seat attachment device.

FIG. 7 illustrates an example of another embodiment of the seat attachment device 10. In this embodiment of the seat attachment device, like elements have the same reference numeral and perform the same function as described above. In this embodiment, the securing mechanism 26 may be a spring as shown instead of the O-ring shown in the previous embodiment. FIG. 8 illustrates an example of another embodiment of the seat attachment device 10. In this embodiment, like elements have the same reference numerals as above. In the embodiment shown in FIG. 8, each outer clamp 18, 20 has the interface surface which may be a knurled surface 50 (or teeth) instead of the chamfered surface in the embodiments shown above. In this embodiment, the outer clamps may be made of a harder material, such as steel or an alloy, so that the teeth or knurled surface can be forged into the outer clamps 18, 20. In this embodiment, the seat attachment mechanism 10 is releasably secured to the post 12 when the teeth 50 of the outer clamp 18, 20 are pressed against the tapered portion 31 of the post 12 to secure the seat attachment device 10 to the post 12. As with the other embodiment, the angle of seat attachment device 10 (and therefore the seat rails and seat) relative to the post 12 may be adjusted by loosening the securing mechanism 24, adjusting the clamps position 14-20 on the head 32 and then retightening the securing mechanism.

Figure 9:
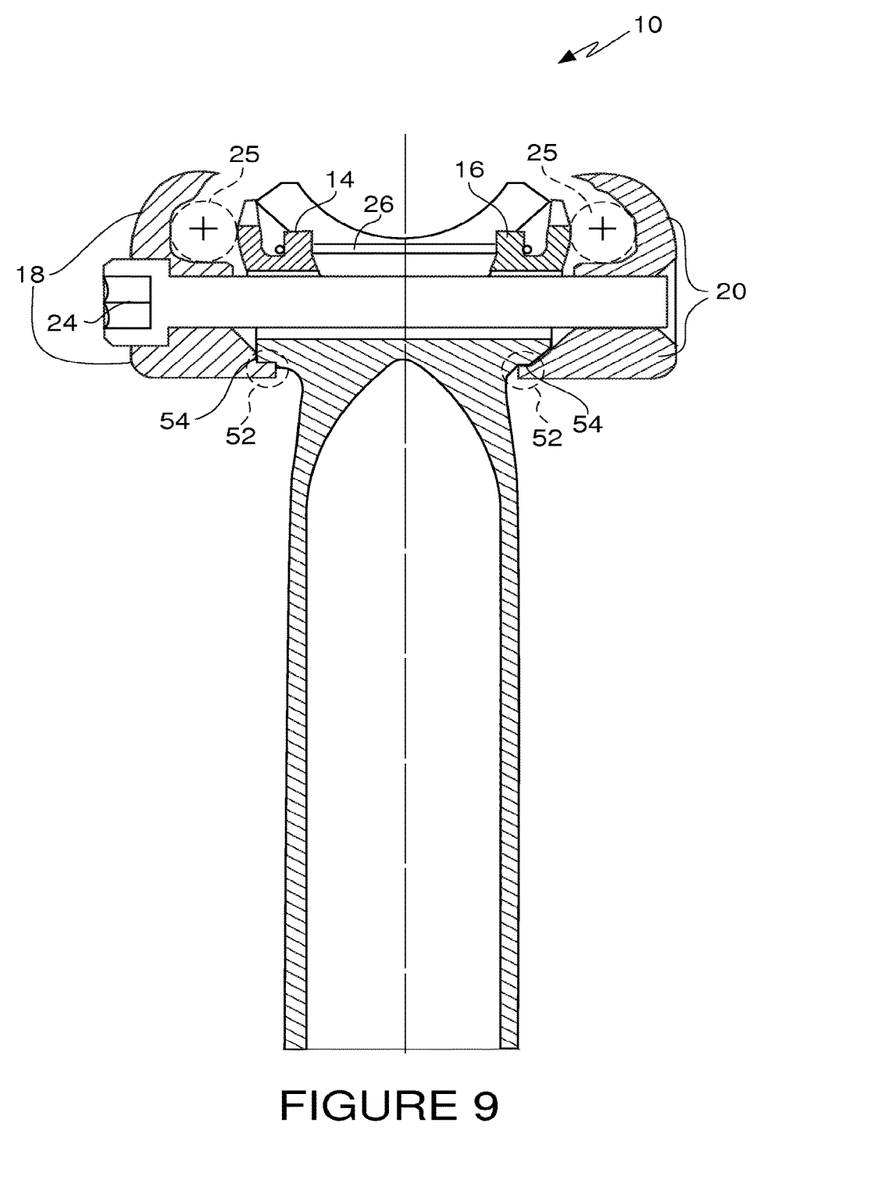
FIG. 9 illustrates an example of another embodiment of the seat attachment device.

FIG. 9 illustrates an example of another embodiment of the seat attachment device 10 wherein each outer clamp 18, 20 has the interface surface which is a shoulder region 52 in this embodiment and the post 12 has the interface surface that is a pair of shoulder regions 54 in this embodiment. When the seat attachment device 10 is assembled and the securing mechanism 24 is tightened, the shoulder regions 52, 54 are press fit into each other to releasably secure to the seat attachment device 10 to the post 12. In order to ensure that the shoulder regions 52, 54 do not slip with respect to each other, the outer clamps 18, 20 and/or post 12 may have knurling on the shoulder regions 52 or 54 to provide more resistance to sliding when the outer clamps 18,20 and post 12 are press fit together. As with the other embodiments, the angle of the seat attachment device 10 relative to the post 12 may be adjusted by loosening the securing mechanism 24.

Figure 10:
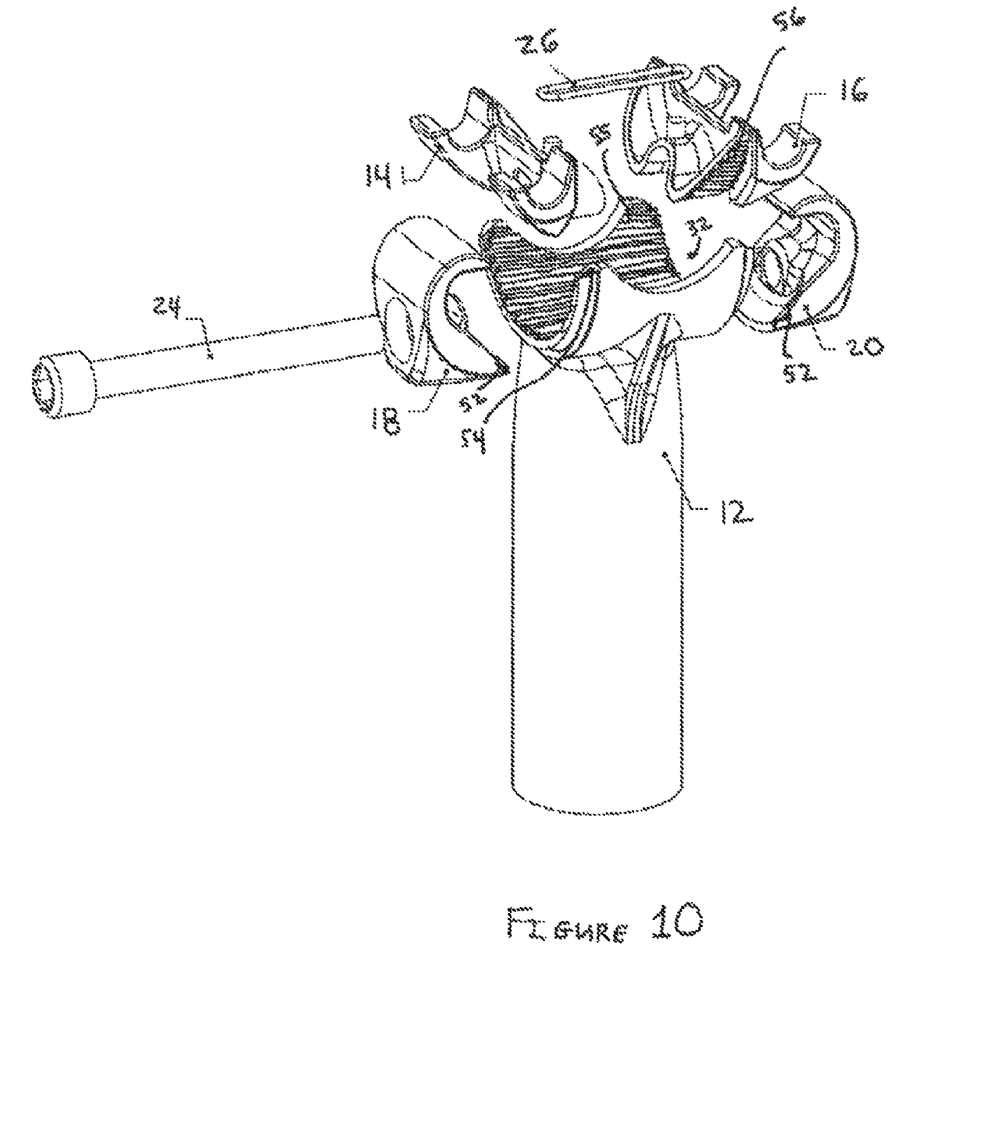
FIG. 10 illustrates an example of another embodiment of the seat attachment device.

FIG. 10 illustrates an example of another embodiment of the seat attachment device 10. In this embodiment, the outer clamps 18, 20 have the shoulder regions 52 and the post 12 includes the shoulder regions 54. In addition, an inner portion 55 of the head portion 32 of the post 12 may further comprise knurling or teeth (teeth are shown in FIG. 10) and an underside region 56 of the inner clamps 14, 16 may also further comprise knurling or teeth (wherein teeth are shown in FIG. 10.) The teeth on both the head portion 32 and the inner clamps 14,16 permit the angle of the seat attachment device 10 relative to the post 12 to be adjusted to a plurality of positions wherein each position exists when the teeth of the inner clamps 14, 16 are locked into the corresponding teeth of the head region 32 of the post 12.

Figure 11A:
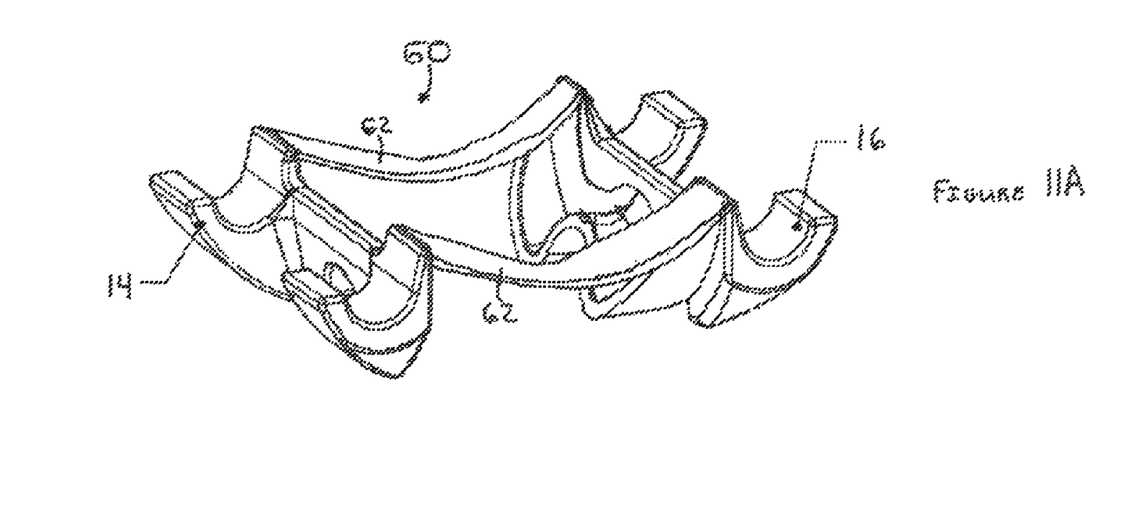
FIGS. 11A and B illustrate two examples of a single piece inner clamp mechanism.
Figure 11B:
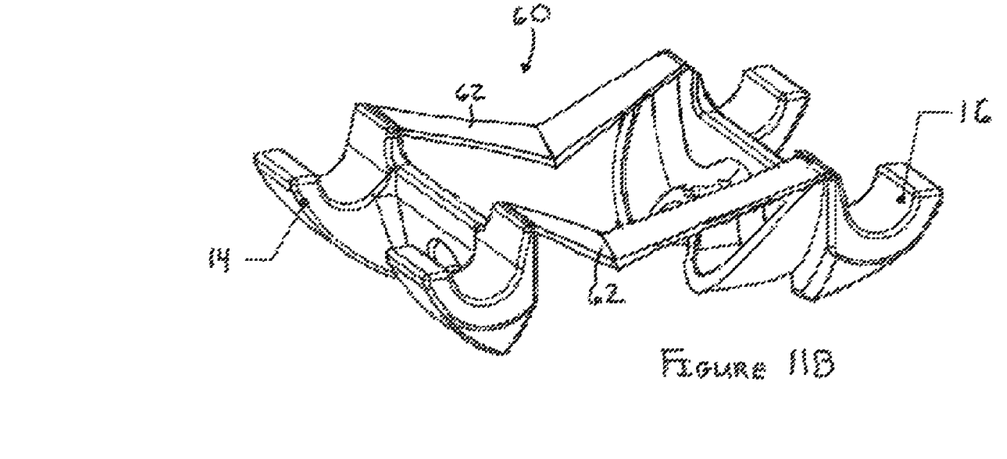

FIGS. 11A and B illustrate two examples of a single piece inner clamp mechanism 60. As discussed above, the inner clamp mechanism may be formed from a single piece as shown in FIGS. 11A and 11B so that the mechanism 26 and the post members 28 are not part of this single piece inner clamp 60. The single piece inner clamp mechanism 60 may further comprise a set of members 62 (shown as either a curved set of pieces in FIG. 11A or a straight set of pieces with a bend in FIG. 11B) that connect the first and second inner clamps 14, 16 thus forming a single piece. The set of members 62 may be formed as a single piece with the first and second inner clamps 14, 16 or may be formed separately and then secured to the first and second clamps 14, 16. The set of members 62 is preferably made of a material with some flexibility and/or memory, such as aluminum or steel or plastic, so that the set of members absorb the force and energy (compress) when the seat attachment mechanism is tightened by the securing mechanism 24 and then release the energy (uncompress) when the securing mechanism 24 is loosened and return to their uncompressed state.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An outer clamp for a seat attachment device, comprising:
   a curved channel region having a curved inner interface surface that interfaces with a circular seat rail;
   a bore, located underneath the channel region, through which a securing mechanism may be passed; and
   a single interface surface sloping towards a post, located only below the bore, that may be pressed against the post in order to secure the outer clamp to the post.

2. The clamp of claim 1, wherein the interface surface further comprises a chamfered surface.

3. The clamp of claim 1, wherein the interface surface further comprises one of a knurled surface and a set of teeth.

4. The clamp of claim 3, wherein the outer clamp is made of one of steel and an alloy.

5. The clamp of claim 1, wherein the interface surface further comprises a shoulder region at a bottom end of the interface surface.

6. The clamp of claim 5, wherein the shoulder region further comprise one of a knurled surface and a set of teeth.

7. The clamp of claim 1, wherein the outer clamp is made of aluminum.

8. The clamp of claim 1, wherein the outer clamp is made of carbon fiber with an aluminum insert.

* * * * *